(12) United States Patent
Coppola et al.

(10) Patent No.: US 12,517,820 B2
(45) Date of Patent: Jan. 6, 2026

(54) LOGICAL BLOCK ADDRESS STATUS IDENTIFICATION

(71) Applicant: Micron Technology, Inc., Boise, ID (US)

(72) Inventors: Gianluca Coppola, Saviano (IT); Marco Di Pasqua, Naples (IT)

(73) Assignee: Micron Technology, Inc., Boise, ID (US)

( * ) Notice: Subject to any disclaimer, the term of this patent is extended or adjusted under 35 U.S.C. 154(b) by 5 days.

(21) Appl. No.: 18/604,824

(22) Filed: Mar. 14, 2024

(65) Prior Publication Data

US 2025/0181496 A1 Jun. 5, 2025

Related U.S. Application Data

(60) Provisional application No. 63/604,573, filed on Nov. 30, 2023.

(51) Int. Cl.
*G06F 12/02* (2006.01)
*G06F 12/0808* (2016.01)

(52) U.S. Cl.
CPC ...... *G06F 12/0246* (2013.01); *G06F 12/0808* (2013.01)

(58) Field of Classification Search
None
See application file for complete search history.

(56) References Cited

U.S. PATENT DOCUMENTS

| 11,216,365 B1 * | 1/2022 | Kuzmin | G06F 11/1068 |
| 2011/0106804 A1 * | 5/2011 | Keeler | G06F 16/35 |
| | | | 707/823 |
| 2025/0053338 A1 * | 2/2025 | Jadon | G06F 12/10 |

* cited by examiner

*Primary Examiner* — Kevin Verbrugge
(74) *Attorney, Agent, or Firm* — Harrity & Harrity, LLP

(57) ABSTRACT

Implementations described herein relate to logical block address status identification. In some implementations, a processing device may send, and a memory device may receive, a command that includes at least a first argument and a second argument. The first argument may indicate a logical block address start value and the second argument may indicate a logical block address range value. The memory device may send, and the processing device may receive, a packet that includes a list of logical block addresses and that indicates, for each logical block address in the list of logical block addresses, whether the logical block address is valid or invalid. The processing device may identify a mismatch between a valid logical block address and a corresponding file system entry, and may send, to the memory device, an erase command that indicates to erase the valid logical block address.

15 Claims, 7 Drawing Sheets

LOGICAL BLOCK ADDRESS STATUS IDENTIFICATION

CROSS-REFERENCE TO RELATED APPLICATION

This Patent application claims priority to U.S. Provisional Patent Application No. 63/604,573, filed on Nov. 30, 2023, entitled "LOGICAL BLOCK ADDRESS STATUS IDENTIFICATION," and assigned to the assignee hereof. The disclosure of the prior Application is considered part of and is incorporated by reference into this Patent Application.

TECHNICAL FIELD

The present disclosure generally relates to memory devices, memory device operations, and, for example, to logical block address status identification.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
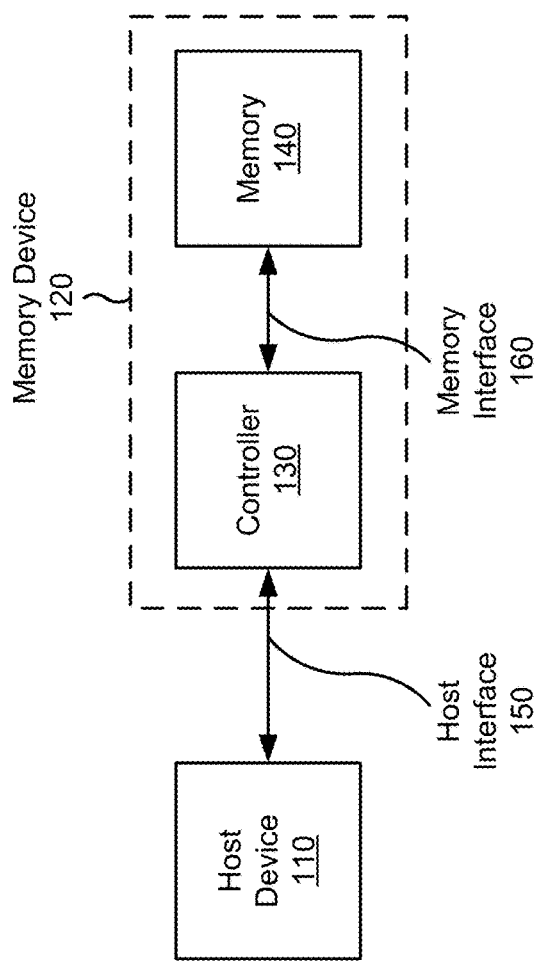
FIG. 1 is a diagram illustrating an example system capable of performing logical block address status identification.

Memory devices are electronic components that are capable of storing and retrieving data within various electronic systems. A memory device may include volatile memory (such as RAM) that loses data when power is removed and/or may include non-volatile memory that retains data after power is removed. NAND memory is a type of non-volatile memory that is structured as an array of memory cells and is organized into pages and blocks. A NAND memory device may perform read operations to retrieve data from the NAND memory cells, may perform write operations to program new data into the memory cells or to move data around within the memory cells (for example, to maintain an even wear on the memory cells and to extend a lifespan of the NAND device), and may perform erase operations to erase data from the memory cells (for example, a block of memory cells).

An amount of used and unused space within the memory cells of the NAND device may be referred to as a filling level. As data is written to the memory cells of the NAND device and erased from the memory cells of the NAND device, the filling level of the memory cells fluctuates, which may impact the efficiency and performance of the NAND device. In some cases, the performance of the NAND device may vary significantly based on the filling level of the memory cells. For example, writing data to a block of memory with a low filling level may be faster since there may be little to no need to perform data movement or erasure. In contrast, writing data to a block of memory with a high filling level may be slower due to the need for data to be erased and/or moved. In some cases, a processing device (for example, a host device) may send an erase command to the NAND device to reduce the filling level of the NAND device, which may improve a write performance of the NAND device. Additionally, or alternatively, wear-leveling algorithms may be used by the processing device in order to evenly distribute write and erase operations across the memory cells and to extend the lifespan of the NAND device.

A managed NAND (mNAND) is a type of memory device that integrates NAND memory chips with a memory controller and firmware into a single package. This integration offers a complete, self-contained storage solution that may be used in embedded systems such as smartphones, tablets, smart televisions, and Internet of Things (IoT) devices. Managed NAND devices simplify the integration process for device manufacturers by providing a standardized interface, error correction, wear-leveling, and block management within a single package, thereby reducing the complexity of managing the NAND memory at the software level and at the firmware level. Managed NAND may be an attractive option for applications where data storage is to be compact, reliable, and easy to integrate (for example, in order to save time and reduce development complexities).

A logical block address (LBA) may be used to identify specific data blocks within a memory device and to serve as a consistent way to reference and locate data. Each LBA may correspond to a fixed-sized data block within the memory device. In some examples, the fixed size data block may be in the range of 512 bytes to 4 kilobytes (KB). In some examples, LBAs may be assigned sequentially. For example, a first LBA may have a value of zero, and the LBA may be incremented (for example, by one) as data is stored in the memory cells. LBAs provide a level of abstraction that enables an operating system and file system to interact with memory devices without needing to be concerned with the physical organization of the data. This abstraction simplifies data management and enables features such as random-access, error correction, and wear leveling to be handled at the hardware level. As data is read from the memory cells or written to the memory cells, the storage controller may map LBAs to the physical locations on the memory device, thereby allowing for efficient data retrieval and management while shielding a user and higher-level software from the underlying complexity of the physical structure of the memory device. An LBA is "invalid" if data stored at the LBA is invalid. For example, the LBA may be invalid if a processing device has not written the data to the LBA or if the processing device has erased the data from the LBA. In contrast, an LBA is "valid" if data stored at the LBA is valid. For example, the LBA may be valid if the processing device has written the data to the LBA and the processing device has not erased the data from the LBA.

In some cases, problems in NAND memory management may result from a mismatch between software levels. For example, in some applications, there may be several layers of software, and it may be possible to have a mismatch of information between the different layers of software. In one example, a processing device (for example, a host file system) may erase data at the file system level. However, the processing device (for example, software of the processing device) may not have sent an erase command to the NAND device to erase the data at the NAND device. As a result, the mapping of data may be different at the host file system layer and at the NAND device. The processing device may not be able to efficiently check for mismatches between the layers. In one example, the processing device and the NAND device may be associated with an automobile. Vendor commands may be issued by the processing device, for example, to perform a debugging operation or to verify a discard policy at the NAND device. However, the commands may need to be issued separately for each LBA that is to be verified by the processing device. This may be time consuming and may be a significant waste of processing resources. Additionally, or alternatively, this may expose the physical mapping of the NAND device to the processing device, which may reduce the safety of the automobile. Thus, the processing device may not be able to compare file system data with NAND data, and therefore, may not be able to determine if there is a chance to reduce the filling level of the NAND device. This may result in the NAND device having a high filling level, which may result in reduced write performance, slower read and write operations, increased power consumption, and reduced lifetime of the NAND device, among other examples.

Various implementations are described herein for LBA status identification. In some implementations, a processing device (for example, a host device) may send, to a memory device, a command that includes a first argument and a second argument, where the first argument indicates an LBA start value and the second argument indicates an LBA range value. The memory device may receive the command from the processing device and may identify, for each LBA beginning at an LBA indicated by the LBA start value and included in a range of LBAs indicated by the LBA range value, whether the LBA is valid or invalid. The memory device may send, to the processing device, a packet that includes a list of LBAs and that indicates whether each LBA included in the list of LBAs is valid or invalid. In one example, the memory device may generate a table that includes a plurality of entries, where each entry includes an LBA and a bit indicating whether a corresponding LBA is valid (for example, using a value of zero) or invalid (for example, using a value of one). The processing device may receive the packet from the memory device and may compare the data included in the packet to data that is stored at the host file system. For example, the processing device may compare each LBA that is indicated in the table as a valid LBA with data that is stored at the processing device. In some implementations, the processing device may detect a mismatch between a valid LBA and data that is stored at the processing device, and may send an erase command for the LBA associated with the mismatch. For example, the processing device may determine that data stored at the valid LBA no longer needs to be stored by the NAND, and may send an erase command to the NAND that indicates for the NAND to erase the data stored at the LBA. This may enable the processing device to determine, for multiple LBAs (for example, a range of LBAs) and using a single command, whether the LBA is valid or invalid, and to identify whether there is a mismatch between data stored at the LBA and data stored at a corresponding location in the host file system. The processing device may issue an erase command for an LBA associated with a mismatch, which may result in the NAND having a lower filling level, thereby improving write performance by the NAND, enabling faster read and write operations at the NAND, reducing power consumption at the NAND, and increasing a lifetime of the NAND. Additional details regarding these features are described below.

FIG. 1 is a diagram illustrating an example system 100 capable of performing logical block address status identification. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, an embedded multimedia card (eMMC) device, and/or a universal flash storage (UFS) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include control logic, a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, one or more systems, devices, apparatuses, components, and/or controllers of FIG. 1 may be configured to receive, from a host device, a command that includes at least a first argument and a second argument, wherein the first argument indicates a logical block address start value and the second argument indicates a logical block address range value; and to send, to the host device, a packet that includes a list of logical block addresses and that indicates, for each logical block address in the list of logical block addresses, whether the logical block address is valid or invalid, wherein a first logical block address in the list of logical block addresses corresponds to the logical block address start value, and wherein a quantity of logical block addresses in the list of logical block addresses corresponds to the logical block address range value.

In some implementations, one or more systems, devices, apparatuses, components, and/or controllers of FIG. 1 may be configured to: send, to a memory device, a command that includes at least a first argument and a second argument, wherein the first argument indicates a logical block address start value and the second argument indicates a logical block address range value; and to receive, from the memory device, a packet that includes a list of logical block addresses and that indicates, for each logical block address in the list of logical block addresses, whether the logical block address is valid or invalid, wherein a first logical block address in the list of logical block addresses corresponds to the logical block address start value, and wherein a quantity of logical block addresses in the list of logical block addresses corresponds to the logical block address range value.

As indicated above, FIG. 1 is provided as an example. Other examples may differ from what is described with regard to FIG. 1.

Figure 2:
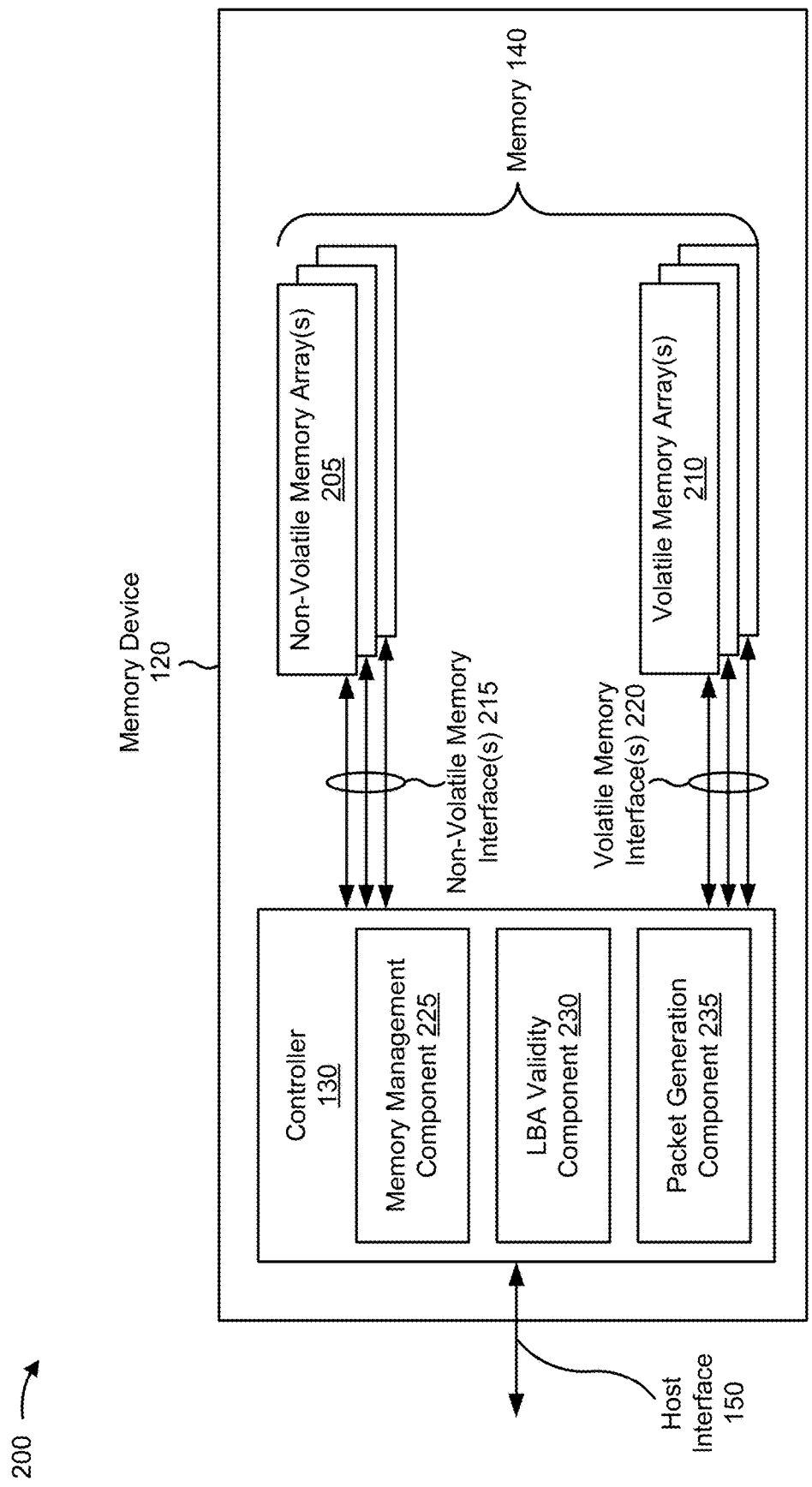
FIG. 2 is a diagram of example components included in a memory device.

FIG. 2 is a diagram of example components 200 included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, an LBA validity component 230, and/or a packet generation component 235. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The LBA validity component 230 may be configured to identify whether an LBA is valid or invalid. In some implementations, the LBA validity component 230 may obtain an LBA start value (LBA Start) and an LBA range value (LBA Range). For example, the LBA validity component 230 may receive, from the host device 110 via the host interface 150, a first argument that indicates the LBA start value and a second argument that indicates the LBA range value. The LBA validity component 230 may identify, for each LBA within a range of LBAs corresponding to the LBA range value and beginning at an LBA corresponding to the LBA start value, whether the LBA is valid or invalid. The LBA validity component 230 may identify that an LBA is invalid if data has not been written to the LBA by the host device 110 or if data has been erased from the LBA by the host device 110. Alternatively, the LBA validity component 230 may identify that an LBA is valid if data has been written to the LBA by the host device 110 and if the data that has been written to the LBA has not been erased from the LBA by the host device 110.

The packet generation component 235 may be configured to generate a packet that includes information indicating whether an LBA is valid or invalid. For example, the packet generation component 235 may generate a packet that includes a list of LBAs and that indicates, for each LBA in the list of LBAs, whether the LBA is valid or invalid. The list of LBAs may include the range of LBAs corresponding to the LBA range value and may begin at the LBA corresponding to the LBA range value. For example, a first LBA in the list of LBAs may correspond to an LBA having the LBA start value, and a quantity of LBAs included in the list of LBAs may be equal to the LBA start value plus the LBA range value minus one (LBA Start+LBA Range−1). In some implementations, the packet generation component may generate a table that includes a plurality of entries, where each entry includes an LBA and a bit indicating whether the LBA is valid or invalid. For example, a bit having a first value ("0") may indicate that the corresponding LBA is valid, whereas a bit having a second value ("1") may indicate that the corresponding bit is invalid. The memory device 120 and/or the packet generation component 235 may send the packet that includes the list (and/or the table) of valid LBAs and invalid LBAs to the host device 110.

Figure 4:
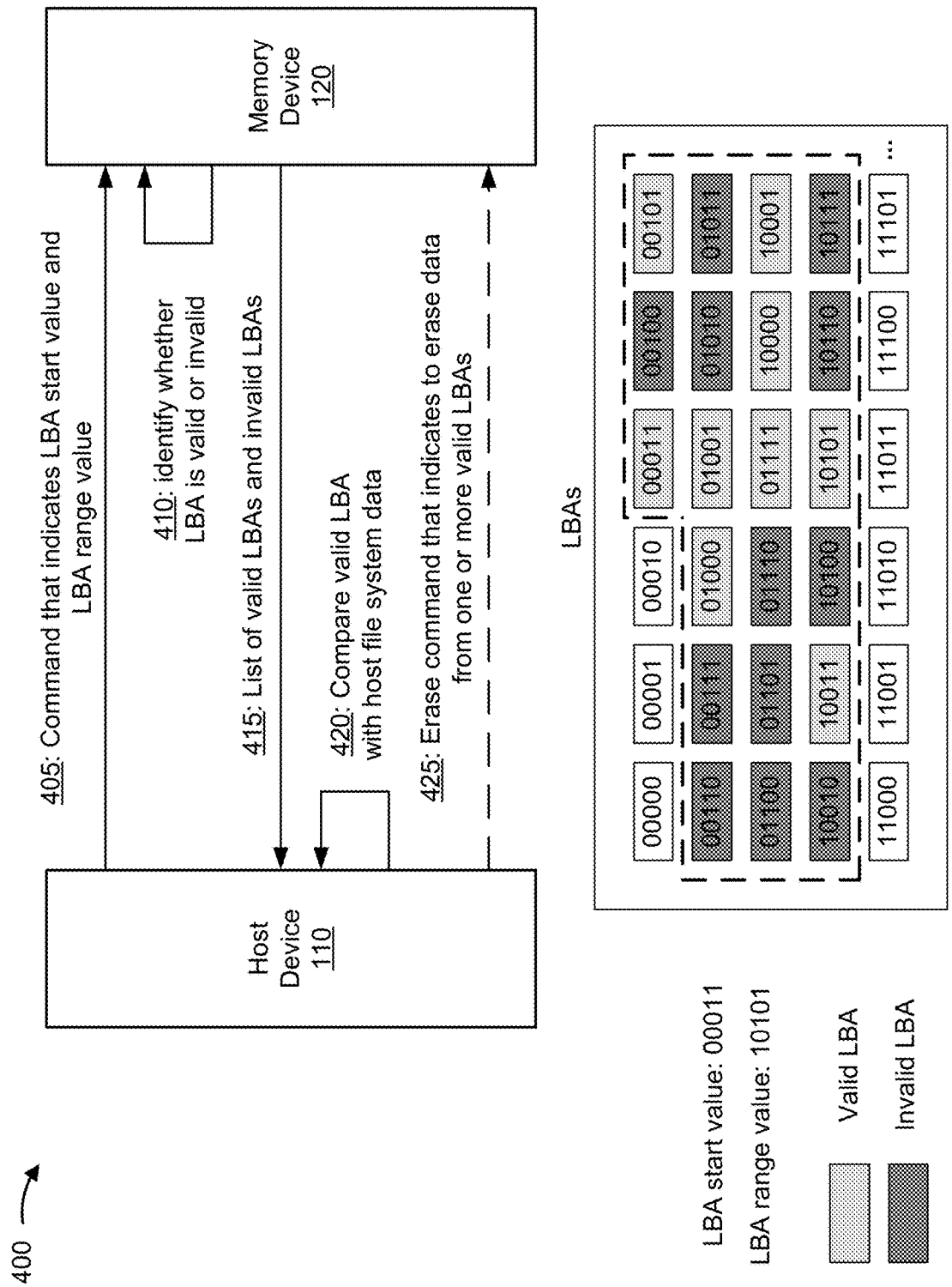
FIG. 4 is a diagram illustrating an example process for logical block address status identification.
Figure 6:
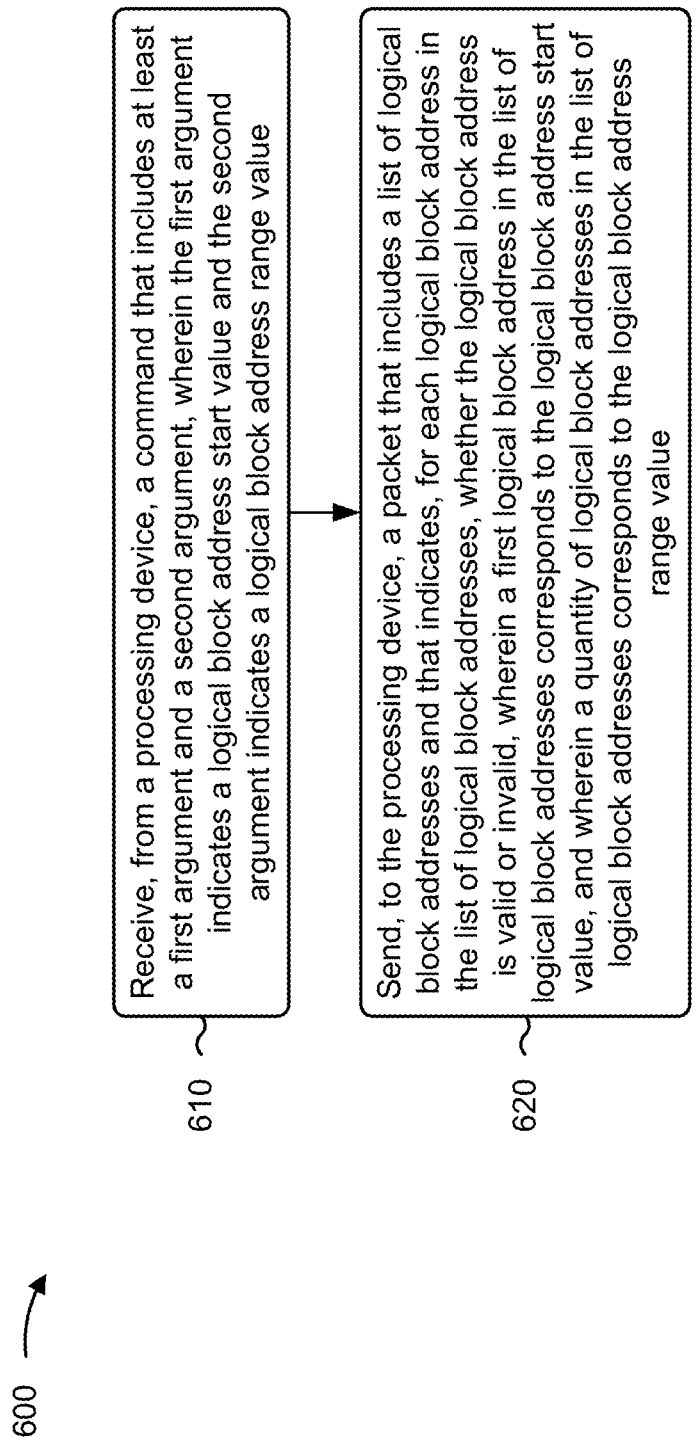
FIG. 6 is a flowchart of an example method for logical block address status identification performed by a memory device.

One or more devices or components shown in FIG. 2 may be configured to perform operations described herein, such as one or more operations of FIG. 4 and/or one or more process blocks of the method of FIG. 6. For example, the controller 130, the memory management component 225, the LBA validity component 230, and/or the packet generation component 235 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
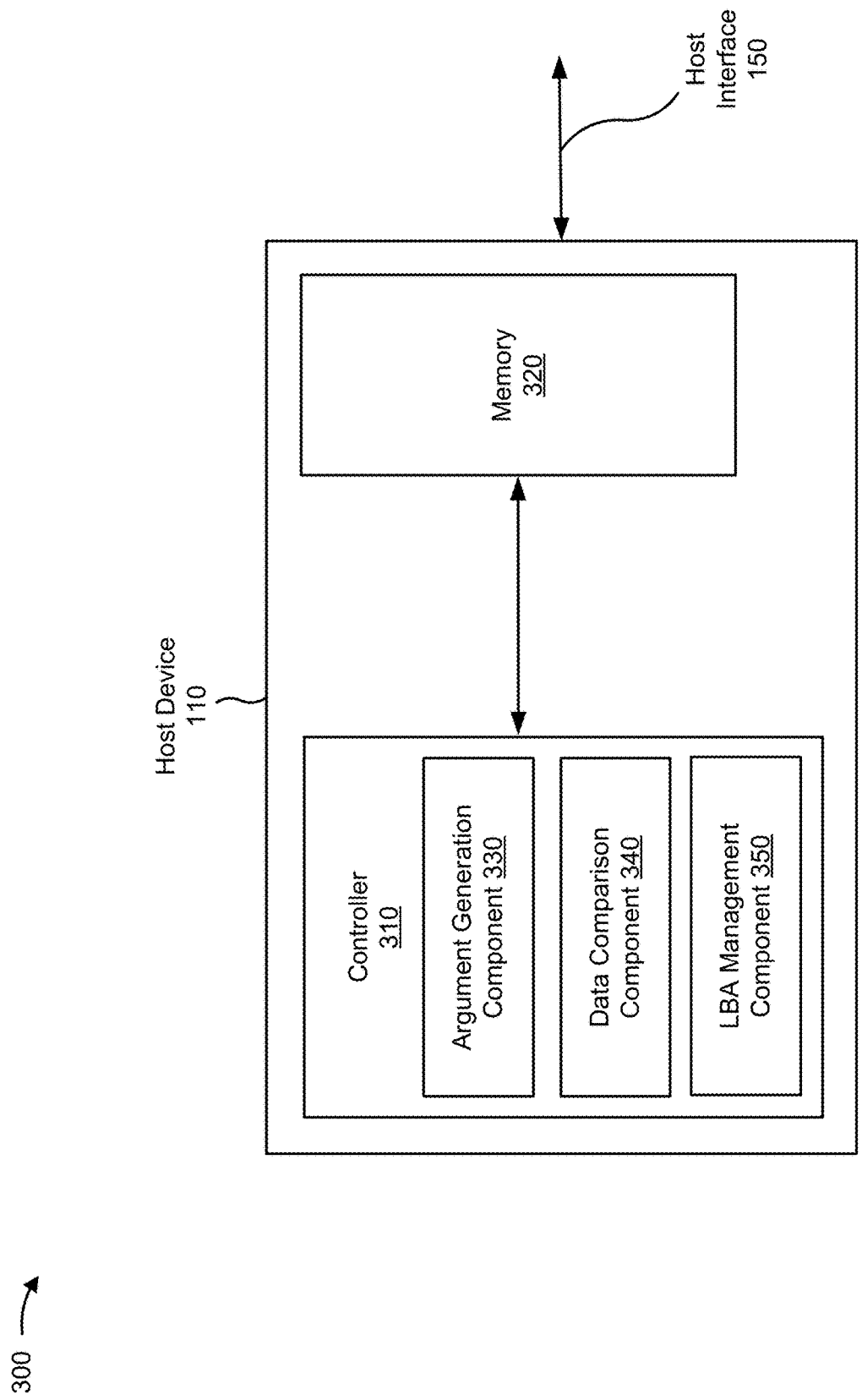
FIG. 3 is a diagram of example components included in a host device.

FIG. 3 is a diagram of example components 300 included in a host device 110. The host device 110 may include a controller 310 and memory 320. The controller 310 associated with the host device 110 may include some or all of the features of the controller 130 associated with the memory device 120. Additionally, or alternatively, the memory 320 associated with the host device 110 may include some or all of the features of the memory 140 associated with the memory device 120.

The controller 310 may control operations of the memory 320, such as by executing one or more instructions. For example, the host device 110 may store one or more instructions in the memory 320, and the controller 310 may execute those one or more instructions. Additionally, or alternatively, the controller 310 may receive one or more instructions from the memory device 120 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 310. The controller 310 may execute the set of instructions to perform one or more operations or methods described herein. In some implementations, execution of the set of instructions, by the controller 310, causes the controller 310 and/or the host device 110 to perform one or more operations or methods described herein. In some implementations, hardwired circuitry is used instead of or in combination with the one or more instructions to perform one or more operations or methods described herein. Additionally, or alternatively, the controller 310 and/or one or more components of the host device 110 may be configured to perform one or more operations or methods described herein.

As shown in FIG. 3, the controller 310 may include an argument generation component 330, a data comparison component 340, and/or an LBA management component 350. In some implementations, one or more of these components are implemented as one or more instructions (e.g., firmware) executed by the controller 310. Alternatively, one or more of these components may be implemented as dedicated integrated circuits distinct from the controller 310.

The argument generation component 330 may be configured to generate one or more arguments. For example, the argument generation component 330 may be configured to generate one or more arguments associated with determining a validity of one or more LBAs of the memory device 120. In some implementations, the argument generation component 330 may generate a first argument and a second argument. The first argument may indicate an LBA start value (LBA Start). The LBA start value may be a first LBA of the memory device 120 for which a validity is to be determined. The second argument may indicate an LBA range value (LBA Range). The LBA range value may indicate a quantity of LBAs of the memory device 120, starting at the first LBA, for which a validity is to be determined. The host device 110 and/or the argument generation component 330 may send the first argument and the second argument to the memory device 120 via the host interface 150.

The data comparison component 340 may be configured to compare data received from the memory device 120 to data stored at the host device 110. For example, the data comparison component 340 may be configured to compare LBA validity data received from the packet generation component 235 of the memory device 120 with data stored at a file system of the host device 110. In some implementations, the data comparison component 340 may compare each LBA that is indicated as a valid LBA (for example, in the list or table received from the packet generation component 235) to a corresponding valid entry in the file system of the host device 110. The data comparison component 340 may detect a mismatch between a valid LBA and a corresponding entry in the file system of the host device 110, for example, if the host device 110 determines that the data stored at the LBA is no longer needed, that the data stored at the LBA should have been erased at a prior time, or that the data should never have been written to the LBA.

The LBA management component 350 may be configured to issue commands for managing the data stored in the LBAs of the memory device 120. In some implementations, the LBA management component may obtain an indication that data stored at an LBA of the memory device 120 is associated with a mismatch. For example, the LBA management component 350 may receive (from the memory device 120 and/or the data comparison component 340) an indication that data stored at the LBA is different than data stored at a corresponding location in the file system of the host device 110. In this example, the LBA management component 350 and/or the host device 110 may send, to the memory device 120, an erase command that indicates to erase the data from the LBA.

Figure 7:
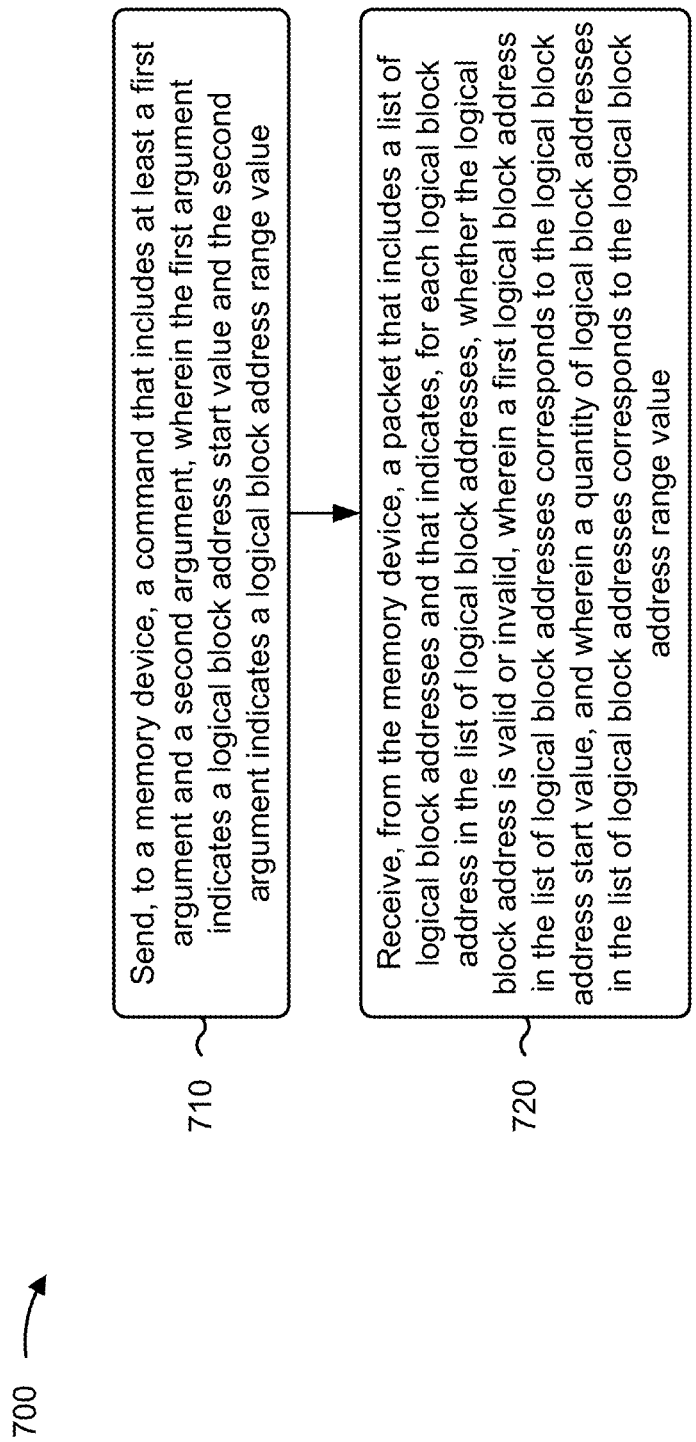
FIG. 7 is a flowchart of an example method for logical block address status identification performed by a host device.

One or more devices or components shown in FIG. 3 may be used to carry out operations described elsewhere herein, such as one or more operations of FIG. 4 and/or one or more process blocks of the method of FIG. 7. For example, the argument generation component 330, the data comparison component 340, and/or the LBA management component 350 may perform one or more operations and/or methods for the host device 110.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more operations described as being performed by another set of components shown in FIG. 3.

FIG. 4 is a diagram illustrating an example 400 of logical block address status identification. A host device (for example, the host device 110) may communicate with the memory device 120 to identify a status of a plurality of logical block addresses. The status may indicate, for example, whether each logical block address of the plurality of logical block addresses is valid or invalid. In some implementations, the memory device 120 may be a NAND device, such as a managed NAND device. While the host device in FIG. 4 is described as the host device 110, the host device may be any type of device, processor, and/or processing device. For example, the memory device 120 may communicate with a processing device that performs one or more functions of the host device 110.

As shown by reference number 405, the host device 110 may send a command to the memory device 120. The command may be a vendor command. The command may include at least a first argument and a second argument. The first argument may indicate an LBA start value (LBA Start) and the second command may indicate an LBA range value (LBA Range). In some implementations, the command may indicate for the memory device 120 to determine a validity of a quantity of LBAs that corresponds to the LBA range value and that begins at an LBA corresponding to the LBA start value.

In one example, the memory device 120 may include 30 LBAs, where each LBA is indicated by a five-digit binary representation. For example, a first LBA may be indicated by 00000, a second LBA may be indicated by 00001, and a last (thirtieth) LBA may be indicated by 11101. As shown in the example 400, the host device 110 may send a command to the memory device 120. The command may include a first argument that indicates an LBA start value (LBA Start=00011) and a second argument that indicates an LBA range value (LBA Range=10101). In this example, the host device 110 sends a single command that instructs the memory device 120 to identify a validity of 30 LBAs starting at LBA 00011 (LBA 4).

As shown by reference number 410, the memory device 120 may identify whether an LBA is valid or invalid. In some implementations, the memory device 120 and/or the LBA validity component 230 may identify, for each LBA indicated in the command, whether the LBA is valid or invalid (for example, whether data stored at the LBA is valid or invalid). As described herein, the quantity of LBAs may correspond to a range of LBAs indicated by the LBA range value and starting at the LBA start value. For example, the quantity of LBAs may be equal to LBA Start plus LBA Range minus one (LBA Start+LBA Range−1). In some implementations, the memory device 120 may analyze the LBAs sequentially. For example, the memory device 120 may identify whether data stored at a first LBA (indicated by LBA Start) is valid or invalid. Next, the memory device 120 may identify whether data stored at a second LBA (LBA Start+1) is valid or invalid. The memory device 120 may repeat this process for each LBA of the quantity of LBAs, and finally, may identify whether data stored at a last LBA indicated in the command (LBA Start+LBA Range−1) is valid or invalid. In some other implementations, the memory device may analyze the LBAs in parallel. As described herein, the memory device 120 may determine that data stored at an LBA of the quantity of LBAs is invalid if the host device 110 has not written data to the LBA or if the host device 110 has erased the data from the LBA. Alternatively, the memory device 120 may determine that data stored at an LBA of the quantity of LBAs is valid if the host device 110 has written data to the LBA and the host device 110 has not erased the data from the LBA.

As shown in the example 400, the memory device 120 may analyze each LBA indicated in the command. For example, the memory device 120 may analyze each LBA starting at LBA 00011 and within a range of LBAs corresponding to the LBA range value 10101. Thus, the memory device 120 may analyze each LBA from LBA 00011 to LBA 10111 to determine whether the LBA is valid or invalid. In the example where the memory device 120 is to analyze the LBAs sequentially, the memory device may first determine whether LBA 00011 is valid or invalid. Next, the memory device 120 may determine whether LBA 00100 is valid or invalid. The memory device 120 may repeat this process for each LBA up to and including 10111.

As shown by reference number 415, the memory device 120 may generate a list of valid LBAs and invalid LBAs and may send the list to the host device 110. For example, the memory device 120 and/or the packet generation component 235 may generate a packet that includes the list of LBAs and that includes an indication of whether each LBA in the list of LBAs is valid or invalid. In some implementations, the memory device 120 and/or the packet generation component 235 may generate a table that includes a plurality of entries, where each entry in the table includes an LBA and a bit indicating whether the LBA is valid or invalid. For example, a bit having a first value ("0") may indicate that a corresponding LBA is valid, whereas a bit having a second valid ("1") may indicate that the corresponding LBA is invalid. An example table showing valid LBAs and invalid LBAs is shown in Table 1:

TABLE 1

| LBA | Bit |
|---|---|
| 00011 | 0 |
| 00100 | 1 |
| 00101 | 0 |
| 00110 | 1 |
| 00111 | 1 |
| 01000 | 0 |
| 01001 | 0 |
| 01010 | 1 |
| 01011 | 1 |
| 01100 | 1 |
| 01101 | 1 |
| 01110 | 1 |
| 01111 | 0 |
| 10000 | 0 |
| 10001 | 0 |
| 10010 | 1 |
| 10011 | 0 |
| 10100 | 1 |
| 10101 | 0 |
| 11100 | 1 |
| 11101 | 1 |

As shown by reference number 420, the host device 110 may compare LBA data to data stored at a file system of the host device 110. In some implementations, the host device 110 and/or the data comparison component 340 may compare one or more valid LBAs (for example, LBAs indicated in the list of LBAs as containing valid data) to data stored at the file system of the host device 110. For example, the host device 110 may compare each valid LBA with a corresponding valid file system entry stored at the host device 110. The host device 110 may detect a mismatch between a valid LBA and a corresponding entry in the file system of the host device 110, for example, if the host device 110 determines that the data stored at the LBA is no longer needed, that the data stored at the LBA should have been erased at a prior time, and/or that the data should never have been written to the LBA.

In the example 400, the host device 110 may compare each valid LBA with data stored at the file system of the host device 110. For example, the host device 110 may compare LBA 00011, LBA 00101, LBA 01000, LBA 01001, LBA 01111, LBA 10000, LBA 10001, LBA 10011, and LBA 10101 with corresponding valid entries in the file system of the host device 110. In one example, the host device 110 may identify a mismatch between LBA 01001 and a valid file system entry corresponding to LBA 01001 and may identify a mismatch between LBA 10011 and a valid file system entry corresponding to LBA 10011.

As shown by reference number 425, the host device 110 may send an erase command to the memory device 120. The erase command may indicate for the memory device 120 to erase data from one or more valid LBAs associated with a mismatch. For example, if there is a mismatch between the LBA and the corresponding valid entry in the file system of the host device 110, the host device 110 and/or the LBA management component 350 may send an erase command to the memory device 120 that indicates for the memory device 120 to erase the data from the LBA.

As shown in the example 400, the host device 110 may detect a mismatch associated with LBA 01001 and LBA 10011. For example, the host device 110 may detect a mismatch between LBA 01001 and a valid file system entry corresponding to LBA 01001 and may detect a mismatch between LBA 10011 and a valid file system entry corresponding to LBA 10011. Thus, the host device 110 may send an erase command to the memory device 120 that indicates for the memory device 120 to erase the data included in LBA 01001 and LBA 10011.

The implementations described herein enable the host device 110 to send a vendor command that requests validity data for multiple LBAs from the memory device 120. Additionally, the implementations described herein may enable the memory device 120 to send the validity data for the multiple LBAs to the host device 110. For example, the memory device 120 may send a list of LBAs to the host device 110 that indicates whether each LBA in the list of LBAs is valid or invalid. The host device 110 may compare each valid LBA in the list of LBAs to a corresponding valid entry in a file system of the host device 110. In the event of a mismatch between a valid LBA and a corresponding valid entry in the file system, the host device 110 may send an erase command that indicates for the memory device 120 to erase the data stored at the valid LBA. This may reduce the filling level of the memory device 120, which may result in an improved write performance by the memory device 120, faster read and write operations at the memory device 120, reduced power consumption at the memory device 120, and/or an increased lifetime for the memory device 120. Additionally, the implementations described herein may enable the LBA validity data to be shared with the host device 110 without exposing the physical mapping of the memory device 120 to the host device 110. This may reduce a likelihood of corruption at the memory device 120. In some implementations, the vendor command may be used within a Linux environment. Specifically, the vendor command may be used to debug one or more customer settings in the Linux environment and/or may be used to determine whether a block discard policy at a Linux device is enabled and functioning properly.

As indicated above, FIG. 4 is provided as an example. Other examples may differ from what is described with regard to FIG. 4.

Figure 5:
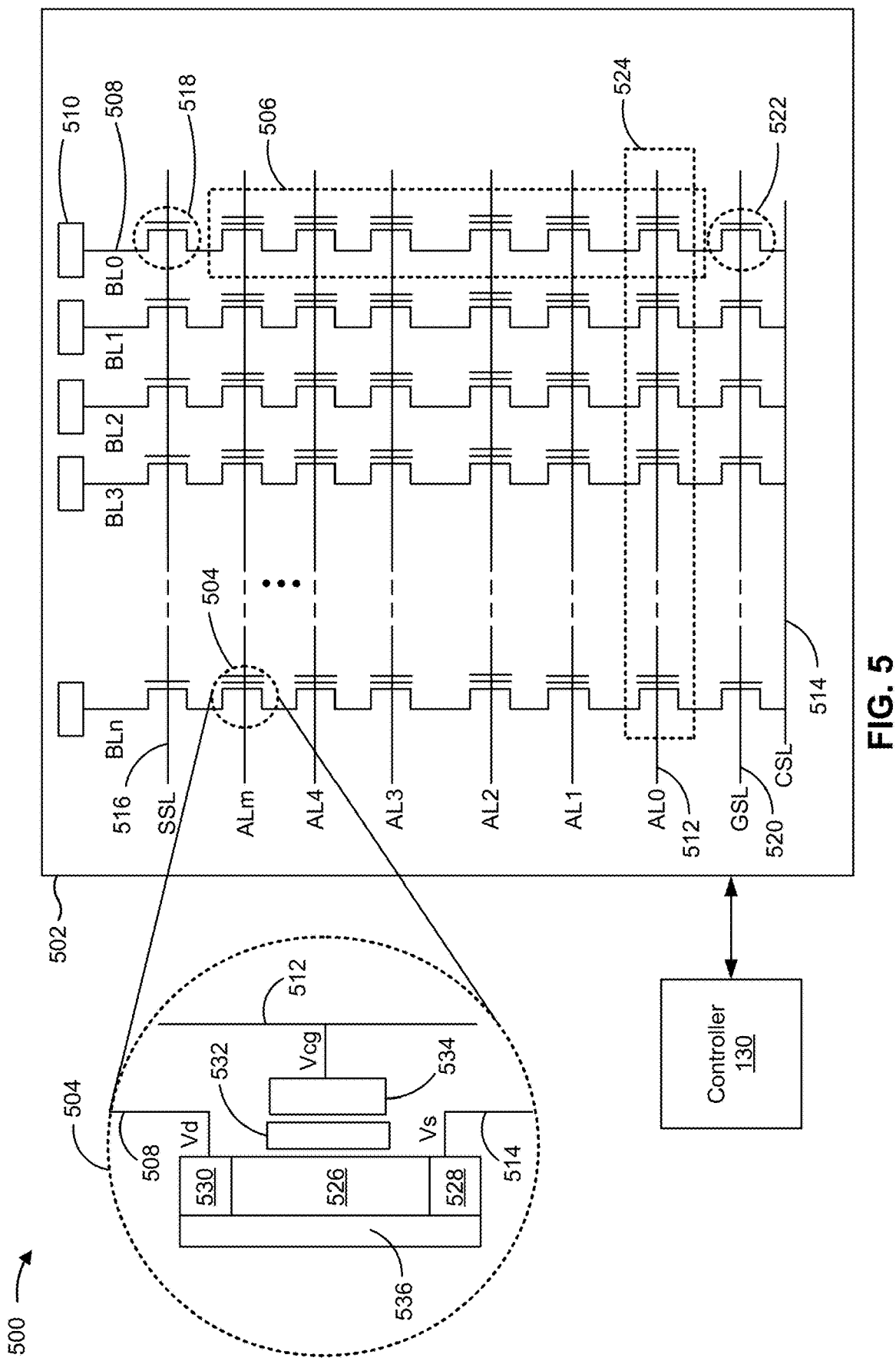
FIG. 5 is a diagram of example components included in NAND memory.

FIG. 5 is a diagram of example components 500 included in a memory device 120. As described above in connection with FIG. 1, the memory device 120 may include a controller 130 and memory 140. As shown in FIG. 5, the memory 140 may include a memory array 502. In some implementations, the memory array 502 is a NAND memory array. However, in some other implementations, the memory array 502 may be another type of memory array, such as a NOR memory array, a resistive RAM (RRAM) memory array, a magneto-resistive RAM (MRAM) memory array, a ferroelectric RAM (FeRAM) memory array, a spin-transfer torque RAM (STT-RAM) memory array, or the like. In some implementations, the memory array 502 may be part of a three-dimensional stack of memory arrays, such as 3D NAND flash memory, 3D NOR flash memory, or the like.

The memory array 502 includes multiple memory cells 504. A memory cell 504 may store an analog value, such as an electrical voltage or an electrical charge, that represents a data state (e.g., a digital value). The analog value and corresponding data state depend on a quantity of electrons trapped or present within a region of the memory cell 504 (e.g., in a charge trap, such as a floating gate), as described below.

A NAND string 506 (sometimes called a string) may include multiple memory cells 504 connected in series. A NAND string 506 is coupled to a bit line 508 (sometimes called a digit line or a column line, and shown as BL0-BLn). Data can be read from or written to the memory cells 504 of a NAND string 506 via a corresponding bit line 508 using one or more input/output (I/O) components 510 (e.g., an I/O circuit, an I/O bus, a page buffer, and/or a sensing component, such as a sense amplifier). Memory cells 504 of different NAND strings 506 (e.g., one memory cell 504 per NAND string 506) may be coupled with one another via access lines 512 (sometimes called word lines or row lines, and shown as AL0-ALm) that select which row (or rows) of memory cells 504 is affected by a memory operation (e.g., a read operation or a write operation).

A NAND string 506 may be connected to a bit line 508 at one end and a common source line (CSL) 514 at the other end. A string select line (SSL) 516 may be used to control respective string select transistors 518. A string select transistor 518 selectively couples a NAND string 506 to a corresponding bit line 508. A ground select line (GSL) 520 may be used to control respective ground select transistors 522. A ground select transistor 522 selectively couples a NAND string 506 to the common source line 514.

A "page" of memory (or "a memory page") may refer to a group of memory cells 504 connected to the same access line 512, as shown by reference number 524. In some implementations (e.g., for single-level cells), the memory cells 504 connected to an access line 512 may be associated with a single page of memory. In some implementations (e.g., for multi-level cells), the memory cells 504 connected to an access line 512 may be associated with multiple pages of memory, where each page represents one bit stored in each of the memory cells 504 (e.g., a lower page that represents a first bit stored in each memory cell 504 and an upper page that represents a second bit stored in each memory cell 504). In NAND memory, a page is the smallest physically addressable data unit for a write operation (sometimes called a program operation).

In some implementations, a memory cell 504 is a floating-gate transistor memory cell. In this case, the memory cell 504 may include a channel 526, a source region 528, a drain region 530, a floating gate 532, and a control gate 534. The source region 528, the drain region 530, and the channel 526 may be on a substrate 536 (e.g., a semiconductor substrate). The memory device 120 may store a data state in the memory cell 504 by charging the floating gate 532 to a particular voltage associated with the data state and/or to a voltage that is within a range of voltages associated with the data state. This results in a predefined amount of current flowing through the channel 526 (e.g., from the source region 528 to the drain region 530) when a specified read voltage is applied to the control gate 534 (e.g., by a corresponding access line 512 connected to the control gate 534). Although not shown, a tunnel oxide layer (or tunnel dielectric layer) may be interposed between the floating gate 532 and the channel 526, and a gate oxide layer (e.g., a gate dielectric layer) may be interposed between the floating gate 532 and the control gate 534. As shown, a drain voltage Vd may be supplied from a bit line 508, a control gate voltage Vcg may be supplied from an access line 512, and a source voltage Vs may be supplied via the common source line 514 (which, in some implementations, is a ground voltage).

To write or program the memory cell 504, a strong positive voltage potential may be created between the control gate 534 and the channel 526 (e.g., by applying a large positive voltage to the control gate 534 via a corresponding access line 512) while current is flowing through the channel 526 (e.g., from the common source line 514 to the bit line 508, or vice versa). The strong positive voltage at the control gate 534 causes electrons within the channel 526 to tunnel through the tunnel oxide layer and be trapped in the floating gate 532. These negatively charged electrons then act as an electron barrier between the control gate 534 and the channel 526 that increases the threshold voltage of the memory cell 504. The threshold voltage is a voltage required at the control gate 534 to cause current (e.g., a threshold amount of current) to flow through the channel 526. Fowler-Nordheim tunneling is an example technique for storing a charge in the floating gate, and other techniques, such as channel hot electron injection, may be used.

To read the memory cell 504, a read voltage may be applied to the control gate 534 (e.g., via a corresponding access line 512), and an I/O component 510 (e.g., a sense amplifier) may determine the data state of the memory cell 504 based on whether current passes through the memory cell 504 (e.g., the channel 526) due to the applied voltage. A pass voltage may be applied to all memory cells 504 (other than the memory cell 504 being read) in the same NAND string 506 as the memory cell 504 being read. For example, the pass voltage may be applied on each access line 512 other than the access line 512 of the memory cell 504 being read (e.g., where the read voltage is applied). The pass voltage is higher than the highest read voltage associated with any memory cell data states so that all of the other memory cells 504 in the NAND string 506 conduct, and the I/O component 510 can detect a data state of the memory cell 504 being read by sensing current (or lack thereof) on a corresponding bit line 508. For example, in a single-level memory cell that stores one of two data states, the data state is a "1" if current is detected, and the data state is a "0" if current is not detected. In a multi-level memory cell that stores one of three or more data states, multiple read voltages are applied, over time, to the control gate 534 to distinguish between the three or more data states and determine a data state of the memory cell 504.

To erase the memory cell 504, a strong negative voltage potential may be created between the control gate 534 and the channel 526 (e.g., by applying a large negative voltage to the control gate 534 via a corresponding access line 512). The strong negative voltage at the control gate 534 causes trapped electrons in the floating gate 532 to tunnel back across the oxide layer from the floating gate 532 to the channel 526 and to flow between the common source line 514 and the bit line 508. This removes the electron barrier between the control gate 534 and the channel 526 and decreases the threshold voltage of the memory cell 504 (e.g., to an empty or erased state, which may represent a "1"). In NAND memory, a block is the smallest unit of memory that can be erased. A block of NAND memory includes multiple pages. Thus, an individual page of a block cannot be erased without erasing every other page of the block. In some implementations, a block may be divided into multiple sub-blocks. A sub-block is a portion of a block and may include a subset of pages of the block and/or a subset of memory cells of the block.

As indicated above, FIG. 5 is provided as an example. Other examples may differ from what is described with regard to FIG. 5.

FIG. 6 is a flowchart of an example method 600 for logical block address status identification performed by a memory device. In some implementations, a memory device (e.g., the memory device 120) may perform or may be configured to perform the method 600. In some implementations, another device or a group of devices separate from or including the memory device (e.g., the system 100) may perform or may be configured to perform the method 600. Additionally, or alternatively, one or more components of the memory device (e.g., the controller 130, the memory management component 225, the LBA validity component 230, and/or the packet generation component 235) may perform or may be configured to perform the method 600. Thus, means for performing the method 600 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 600.

As shown in FIG. 6, the method 600 may include receiving, from a processing device, a command that includes at least a first argument and a second argument, wherein the first argument indicates a logical block address start value and the second argument indicates a logical block address range value (block 610). As further shown in FIG. 6, the method 600 may include sending, to the processing device, a packet that includes a list of logical block addresses and that indicates, for each logical block address in the list of logical block addresses, whether the logical block address is valid or invalid, wherein a first logical block address in the list of logical block addresses corresponds to the logical block address start value, and wherein a quantity of logical block addresses in the list of logical block addresses corresponds to the logical block address range value (block 620).

The method 600 may include additional aspects, such as any single aspect or any combination of aspects described below and/or described in connection with one or more other methods or operations described elsewhere herein.

In a first aspect, a logical block address in the list of logical block addresses is invalid if data has not been written to the logical block address by the processing device or if data has been erased from the logical block address by the processing device, and the logical block address in the list of logical block addresses is valid if data has been written to the logical block address by the processing device and if the data that has been written to the logical block address has not been erased from the logical block address by the processing device.

In a second aspect, alone or in combination with the first aspect, the method 600 includes determining that a logical block address in the list of logical block addresses is invalid based on no data being written to the logical block address or based on the data being erased from the logical block address, or determining that the logical block address in the list of logical block addresses is valid based on data being written to the logical block address and based on the data not being erased from the logical block address.

In a third aspect, alone or in combination with one or more of the first and second aspects, the quantity of logical block addresses begins at a logical block address corresponding to the logical block address start value and ends at a logical block address corresponding to the logical block address start value plus the logical block address range value minus one.

In a fourth aspect, alone or in combination with one or more of the first through third aspects, the list of logical block addresses is a table that includes a plurality of entries, wherein each entry of the plurality of entries includes a logical block address of the quantity of logical block addresses and a bit, wherein the bit having a first value indicates that a corresponding logical block address is valid, and the bit having a second value indicates that the corresponding logical block address is invalid.

In a fifth aspect, alone or in combination with one or more of the first through fourth aspects, the method 600 includes receiving, from the processing device, after sending the packet to the processing device, an erase command that indicates to erase data from one or more valid logical block addresses.

In a sixth aspect, alone or in combination with one or more of the first through fifth aspects, each logical block address of the one or more valid logical block addresses is associated with a mismatch between data stored at the logical block address and data stored at the processing device.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

FIG. 7 is a flowchart of an example method 700 for logical block address status identification performed by a processing device. In some implementations, a processing device (e.g., the host device 110) may perform or may be configured to perform the method 700. In some implementations, another device or a group of devices separate from or including the processing device (e.g., the system 100) may perform or may be configured to perform the method 700.

Additionally, or alternatively, one or more components of the host device (e.g., the argument generation component 330, the data comparison component 340, and/or the LBA management component 350) may perform or may be configured to perform the method 700. Thus, means for performing the method 700 may include the host device and/or one or more components of the host device. Additionally, or alternatively, a non-transitory computer-readable medium may store one or more instructions that, when executed by the processing device, cause the processing device to perform the method 700.

As shown in FIG. 7, the method 700 may include sending, to a memory device, a command that includes at least a first argument and a second argument, wherein the first argument indicates a logical block address start value and the second argument indicates a logical block address range value (block 710). As further shown in FIG. 7, the method 700 may include receiving, from the memory device, a packet that includes a list of logical block addresses and that indicates, for each logical block address in the list of logical block addresses, whether the logical block address is valid or invalid, wherein a first logical block address in the list of logical block addresses corresponds to the logical block address start value, and wherein a quantity of logical block addresses in the list of logical block addresses corresponds to the logical block address range value (block 720).

The method 700 may include additional aspects, such as any single aspect or any combination of aspects described below and/or described in connection with one or more other methods or operations described elsewhere herein.

In a first aspect, a logical block address in the list of logical block addresses is invalid if data has not been written to the logical block address by the apparatus or if data has been erased from the logical block address by the apparatus, and the logical block address in the list of logical block addresses is valid if data has been written to the logical block address by the apparatus and if the data that has been written to the logical block address has not been erased from the logical block address by the apparatus.

In a second aspect, alone or in combination with the first aspect, the quantity of logical block addresses begins at a logical block address corresponding to the logical block address start value and ends at a logical block address corresponding to the logical block address start value plus the logical block address range value minus one.

In a third aspect, alone or in combination with one or more of the first and second aspects, the list of logical block addresses is a table that includes a plurality of entries, wherein each entry of the plurality of entries includes a logical block address of the quantity of logical block addresses and a bit, wherein the bit having a first value indicates that a corresponding logical block address is valid, and the bit having a second value indicates that the corresponding logical block address is invalid.

In a fourth aspect, alone or in combination with one or more of the first through third aspects, the method 700 includes detecting, for one or more valid logical block addresses in the list of logical block addresses, a mismatch between data stored at the valid logical block address and data stored at the apparatus.

In a fifth aspect, alone or in combination with one or more of the first through fourth aspects, the method 700 includes sending, to the memory device, after receiving the packet from the memory device, an erase command that indicates to erase data from the one or more valid logical block addresses.

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein.

In some implementations, a memory device includes one or more components configured to: receive, from a processing device, a command that includes at least a first argument and a second argument, wherein the first argument indicates a logical block address start value and the second argument indicates a logical block address range value; and send, to the processing device, a packet that includes a list of logical block addresses and that indicates, for each logical block address in the list of logical block addresses, whether the logical block address is valid or invalid, wherein a first logical block address in the list of logical block addresses corresponds to the logical block address start value, and wherein a quantity of logical block addresses in the list of logical block addresses corresponds to the logical block address range value.

In some implementations, a system includes a processing device configured to: send, to a memory device, a command that includes at least a first argument and a second argument, wherein the first argument indicates a logical block address start value and the second argument indicates a logical block address range value; and receive, from the memory device, a packet that includes a list of logical block addresses and that indicates, for each logical block address in the list of logical block addresses, whether the logical block address is valid or invalid, wherein a first logical block address in the list of logical block addresses corresponds to the logical block address start value, and wherein a quantity of logical block addresses in the list of logical block addresses corresponds to the logical block address range value.

In some implementations, an apparatus includes means for receiving, from a processing device, a command that includes at least a first argument and a second argument, wherein the first argument indicates a logical block address start value and the second argument indicates a logical block address range value; and means for sending, to the processing device, a packet that includes a list of logical block addresses and that indicates, for each logical block address in the list of logical block addresses, whether the logical block address is valid or invalid, wherein a first logical block address in the list of logical block addresses corresponds to the logical block address start value, and wherein a quantity of logical block addresses in the list of logical block addresses corresponds to the logical block address range value.

In some implementations, an apparatus includes means for sending, to a memory device, a command that includes at least a first argument and a second argument, wherein the first argument indicates a logical block address start value and the second argument indicates a logical block address range value; and means for receiving, from the memory device, a packet that includes a list of logical block addresses and that indicates, for each logical block address in the list of logical block addresses, whether the logical block address is valid or invalid, wherein a first logical block address in the list of logical block addresses corresponds to the logical block address start value, and wherein a quantity of logical block addresses in the list of logical block addresses corresponds to the logical block address range value.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
one or more components configured to:
receive, from a processing device, a command that includes at least a first argument and a second argument,
wherein the first argument indicates a logical block address start value and the second argument indicates a logical block address range value;
send, to the processing device, a packet that includes a list of logical block addresses and that indicates, for each logical block address in the list of logical block addresses, whether the logical block address is valid or invalid,
wherein a first logical block address in the list of logical block addresses corresponds to the logical block address start value, and wherein a quantity of logical block addresses in the list of logical block addresses corresponds to the logical block address range value; and
receive, from the processing device, after sending the packet to the processing device, an erase command that indicates to erase data from one or more valid logical block addresses, wherein each logical block address of the one or more valid logical block addresses is associated with a mismatch between data stored at the logical block address and data stored at the processing device.

2. The memory device of claim 1, wherein a logical block address in the list of logical block addresses is invalid if data has not been written to the logical block address by the processing device or if data has been erased from the logical block address by the processing device, and wherein the logical block address in the list of logical block addresses is valid if data has been written to the logical block address by the processing device and if the data that has been written to the logical block address has not been erased from the logical block address by the processing device.

3. The memory device of claim 1, wherein the one or more components are configured to:
determine that a logical block address in the list of logical block addresses is invalid based on no data being written to the logical block address or based on the data being erased from the logical block address; or
determine that the logical block address in the list of logical block addresses is valid based on data being written to the logical block address and based on the data not being erased from the logical block address.

4. The memory device of claim 1, wherein the quantity of logical block addresses begins at a logical block address corresponding to the logical block address start value and ends at a logical block address corresponding to the logical block address start value plus the logical block address range value minus one.

5. The memory device of claim 1, wherein the list of logical block addresses is a table that includes a plurality of entries, wherein each entry of the plurality of entries includes a logical block address of the quantity of logical block addresses and a bit, wherein the bit having a first value indicates that a corresponding logical block address is valid, and the bit having a second value indicates that the corresponding logical block address is invalid.

6. A system, comprising:
a processing device configured to:
send, to a memory device, a command that includes at least a first argument and a second argument,
wherein the first argument indicates a logical block address start value and the second argument indicates a logical block address range value; and
receive, from the memory device, a packet that includes a list of logical block addresses and that indicates, for each logical block address in the list of logical block addresses, whether the logical block address is valid or invalid,
wherein a first logical block address in the list of logical block addresses corresponds to the logical block address start value, and wherein a quantity of logical block addresses in the list of logical block addresses corresponds to the logical block address range value; and
detect, for one or more valid logical block addresses in the list of logical block addresses, a mismatch between data stored at the valid logical block address and data stored at the processing device.

7. The system of claim 6, wherein a logical block address in the list of logical block addresses is invalid if data has not been written to the logical block address by the processing device or if data has been erased from the logical block address by the processing device, and wherein the logical block address in the list of logical block addresses is valid if data has been written to the logical block address by the processing device and if the data that has been written to the logical block address has not been erased from the logical block address by the processing device.

8. The system of claim 6, wherein the quantity of logical block addresses begins at a logical block address corresponding to the logical block address start value and ends at a logical block address corresponding to the logical block address start value plus the logical block address range value minus one.

9. The system of claim 6, wherein the list of logical block addresses is a table that includes a plurality of entries, wherein each entry of the plurality of entries includes a logical block address of the quantity of logical block addresses and a bit, wherein the bit having a first value indicates that a corresponding logical block address is valid, and the bit having a second value indicates that the corresponding logical block address is invalid.

10. The system of claim 6, wherein the processing device is further configured to send, to the memory device, after receiving the packet from the memory device, an erase command that indicates to erase data from the one or more valid logical block addresses.

11. An apparatus, comprising:
means for receiving, from a processing device, a command that includes at least a first argument and a second argument,
wherein the first argument indicates a logical block address start value and the second argument indicates a logical block address range value;
means for sending, to the processing device, a packet that includes a list of logical block addresses and that indicates, for each logical block address in the list of logical block addresses, whether the logical block address is valid or invalid,
wherein a first logical block address in the list of logical block addresses corresponds to the logical block address start value, and wherein a quantity of logical block addresses in the list of logical block addresses corresponds to the logical block address range value; and
means for receiving, from the processing device, after sending the packet to the processing device, an erase command that indicates to erase data from one or more valid logical block addresses, wherein each logical block address of the one or more valid logical block addresses is associated with a mismatch between data stored at the logical block address and data stored at the processing device.

12. The apparatus of claim 11, wherein a logical block address in the list of logical block addresses is invalid if data has not been written to the logical block address by the processing device or if data has been erased from the logical block address by the processing device, and wherein the logical block address in the list of logical block addresses is valid if data has been written to the logical block address by the processing device and if the data that has been written to the logical block address has not been erased from the logical block address by the processing device.

13. The apparatus of claim 11, further comprising:
means for determining that a logical block address in the list of logical block addresses is invalid based on no data being written to the logical block address or based on the data being erased from the logical block address; or
means for determining that the logical block address in the list of logical block addresses is valid based on data being written to the logical block address and based on the data not being erased from the logical block address.

14. The apparatus of claim 11, wherein the quantity of logical block addresses begins at a logical block address corresponding to the logical block address start value and ends at a logical block address corresponding to the logical block address start value plus the logical block address range value minus one.

15. The apparatus of claim 11, wherein the list of logical block addresses is a table that includes a plurality of entries, wherein each entry of the plurality of entries includes a logical block address of the quantity of logical block addresses and a bit, wherein the bit having a first value indicates that a corresponding logical block address is valid, and the bit having a second value indicates that the corresponding logical block address is invalid.

* * * * *